United States Patent
Serizawa

[19]
[11] Patent Number: 6,062,633
[45] Date of Patent: May 16, 2000

[54] HARNESS ASSEMBLING STRUCTURE ON VEHICLE FLOOR

[75] Inventor: Yasuyoshi Serizawa, Shizuoka, Japan

[73] Assignee: Yazaki Corporation, Tokyo, Japan

[21] Appl. No.: 09/161,378

[22] Filed: Sep. 28, 1998

[30] Foreign Application Priority Data

Sep. 26, 1997 [JP] Japan .................................. 9-261962

[51] Int. Cl.⁷ ...................................................... B60J 7/00
[52] U.S. Cl. ........................... 296/199; 296/208; 296/209
[58] Field of Search .................................. 296/199, 209, 296/208, 97.23

[56] References Cited

U.S. PATENT DOCUMENTS

| | | | |
|---|---|---|---|
| 2,208,723 | 7/1940 | Doty | 296/199 |
| 2,218,814 | 10/1940 | Duffy | 296/199 |
| 4,355,842 | 10/1982 | Hira | 296/199 |
| 4,440,434 | 4/1984 | Celli | 296/208 |
| 4,607,878 | 8/1986 | Itoh | 296/209 |
| 5,288,121 | 2/1994 | Graves | 296/97.23 |
| 5,322,335 | 6/1994 | Niemi | 296/97.23 |
| 5,529,365 | 6/1996 | Saunders | 296/208 |
| 5,613,327 | 3/1997 | Sauve | 296/209 |
| 5,902,007 | 5/1999 | Koester et al. | 296/199 |
| 5,938,269 | 8/1999 | Sauve | 296/97.23 |

FOREIGN PATENT DOCUMENTS

| | | | |
|---|---|---|---|
| 003938431 | 5/1991 | Germany | 296/209 |
| 0078892 | 3/1989 | Japan | 296/209 |
| 405301583 | 11/1993 | Japan | 296/209 |

*Primary Examiner*—Joseph D. Pape
*Assistant Examiner*—Kiran Patel
*Attorney, Agent, or Firm*—Sughrue, Mion, Zinn Macpeak & Seas, PLLC

[57] ABSTRACT

A harness assembling structure for assembling a harness on a vehicle floor includes: an inner side sill having a projection piece extending upwardly; an outer side sill having a projection piece extending along the projection piece of the inner side sill; a scuff plate housing the harness and covering the inner side sill and the outer side sill, the scuff plate including, a U-shaped housing portion having an opening downward, for housing the harness, covering pieces continuously and pivotably provided at the housing portion and engage with the opening of the housing portion, and a clamp engaging with the outer side sill; and a hook provided at an end portion of a carpet laid on a floor panel, wherein the hooks are engaged with the projection pieces so as to fix the end portion of the carpet, the clamp is engaged with the outer side sill, so that lower walls of the covering pieces abut against an upper wall of the carpet, and an outer wall of the housing portion fastens the end portion of the carpet together with the projection pieces to fix the scuff plate to the side sill.

6 Claims, 5 Drawing Sheets

HARNESS ASSEMBLING STRUCTURE ON VEHICLE FLOOR

BACKGROUND OF THE INVENTION

The present invention relates to a harness assembling structure on a vehicle floor and, more particularly, relates to a structure for assembling the harness with the end portion of a carpet at the side sill portion of the vehicle.

As shown in FIG. 5, a side sill 1 is provided at the side portion of the vehicle floor. On the upper surface of the side sill 1, a harness (not shown) is assembled together with the end portion of a carpet 3 laid on a floor body and a protector member (hereinafter called as a scuff plate) 5 covering the upper surface of the side sill along the longitudinal direction thereof.

FIG. 6 is an exploded sectional view showing the conventional harness assembling structure on a vehicle floor, and FIG. 7 is a sectional view showing the assembling state of the structure of FIG. 6. The side sill 1 is formed by an inner side sill 9 extending to a floor panel 7 and an outer side sill 11 provided on the out-of-room side. Vertically extending projection pieces (flange portions) 9a, 11a are formed at the end portions of the inner side sill 9 and the outer side sill 11. The inner side sill and the outer side sill of the side sill 1 are combined at the upper walls thereof by welding the flange portions 9a, 11a.

The scuff plate 5 is arranged to have a configuration covering the upper surface of the side sill 1. The scuff plate has an upper wall piece 13 forming an opening portion in which the flange portions 9a, 11a are inserted, side wall pieces 15 extending downward from the opposite ends of the upper wall piece, a lower wall piece 19 provided at the lower end of the room-side side wall piece 15 through a hinge portion 17 so as to be rotatable around the hinge portion, and a hung-down piece 21 extending downward from the upper wall piece so as to be adjacent to the flange portion 9a. The upper wall piece 13, side wall piece 15 and hung-down piece 21 form a U-shaped harness insertion portion 23.

The scuff plate 5 is assembled in a manner that the end portion 3a of the carpet 3 is fixed to the lower wall piece 19 through a tacker 25, then the tower wall piece 19 is engaged within the engagement hole of the hung-down piece 21 after inserting the harness 27 within the harness insertion portion 23, and the scuff plate is fixed to the outer side sill 11 through screws (not shown). Thus, the scuff plate is assembled in a manner that the end portion 3a of the carpet 3 is drawn under the lower wall of the scuff plate and the harness 27 is concealed by the upper wall of the side sill 1.

The aforesaid conventional harness assembling structure on a vehicle floor is configured in a manner that the end portion 3a of the carpet 3 is fixed to the lower wall piece 19 of the scuff plate 5 and the end portion 3a of the carpet 3 is fixed by using the scuff plate 5, and hence there arises the following problems. That is, if the size of the carpet 3 becomes shorter than a desired length due to the error of laying accuracy of the carpet 3, the lower wall piece 19 can not be closed, so that it becomes impossible to fix the scuff plate 5. In contrast, if the size of the carpet 3 becomes longer than the desired length due to the error of the laying accuracy of the carpet, the carpet 3 sags and so the scuff plate 5 rises, whereby it also becomes impossible to fix the scuff plate 5.

Further, since the end portion 3a of the carpet 3 is fixed to the lower wall piece 19 of the scuff plate 5 in a manner that the end portion 3a is fixed to the outer side sill 11 through the scuff plate 5 which is fixed to the outer side sill, the fixing strength applied to the terminal end is not sufficient. Thus, if the drawing force toward the room side is applied to the carpet 3, the scuff plate 5 may be deformed and hence the end portion 3a may be unfixed.

SUMMARY OF THE INVENTION

Accordingly, the present invention has been intended to obviate the aforesaid problem and an object of the present invention is to provide a harness assembling structure on a vehicle floor which can fix a scuff plate without being influenced by the carpet laying procedure and fix the carpet with a high strength thereby to improve the workability of the assembling procedure and the reliability of the carpet fixing function.

In order to achieve the aforesaid object, a harness assembling structure on a vehicle floor according to the present invention comprises: an inner side sill having a projection piece extending upwardly; an outer side sill having a projection piece extending along the projection piece of the inner side sill; a scuff plate housing the harness and covering the inner side sill and the outer side sill, the scuff plate including, a U-shaped housing portion having an opening downward, for housing the harness, covering pieces continuously and pivotably provided at the housing portion and engage with the opening of the housing portion, and a clamp engaging with the outer side sill; and a hook provided at an end portion of a carpet laid on a floor panel, wherein the hooks are engaged with the projection pieces so as to fix the end portion of the carpet, the clamp is engaged with the outer side sill, so that lower walls of the covering pieces abut against an upper wall of the carpet, and an outer wall of the housing portion fastens the end portion of the carpet together with the projection pieces to fix the scuff plate to the side sill.

The harness assembling structure on a vehicle floor may be arranged in a manner that the scuff plate is formed in a front and rear integration type extending from a front-door side side sill to a rear-door side side sill, a notch portion fitting with a center pillar is formed at a substantially center portion of the front and rear integration type scuff plate in a longitudinal direction thereof, and the end portion of the carpet and the harness laid along the front-door side side sill and the rear-door side side sill are assembled by the single front and rear integration type scuff plate.

According to such a harness assembling structure on a vehicle floor according to the present invention, the end portion of the carpet is fixed to the projection pieces through the hooks and the scuff plate is fixed to the outer side sill. Then, the lower walls of the covering pieces abut against the carpet, and the outer wall of the housing portion fastens the end portion of the carpet together with the projection pieces. Thus, the end portion of the carpet is held dually by two means. Further, since the scuff plate and the carpet are fixed independently, the scuff plate fixing procedure is not influenced by the accuracy of the carpet laying procedure.

Further, according to the harness assembling structure on a vehicle floor employing the front and rear integration type scuff plate, the front-door side side sill and the rear-door side side sill can be assembled simultaneously by the single front and rear integration type scuff plate. In this case, since the housing portions are combined even at the center pillar portion, there is no exposed portion of the harness.

DETAILED DESCRIPTION OF THE PREFERRED EMBODIMENTS

Preferred embodiments of the harness assembling structure on a vehicle floor according to the present invention will be described with reference to the accompanying drawings.

Figure 1:
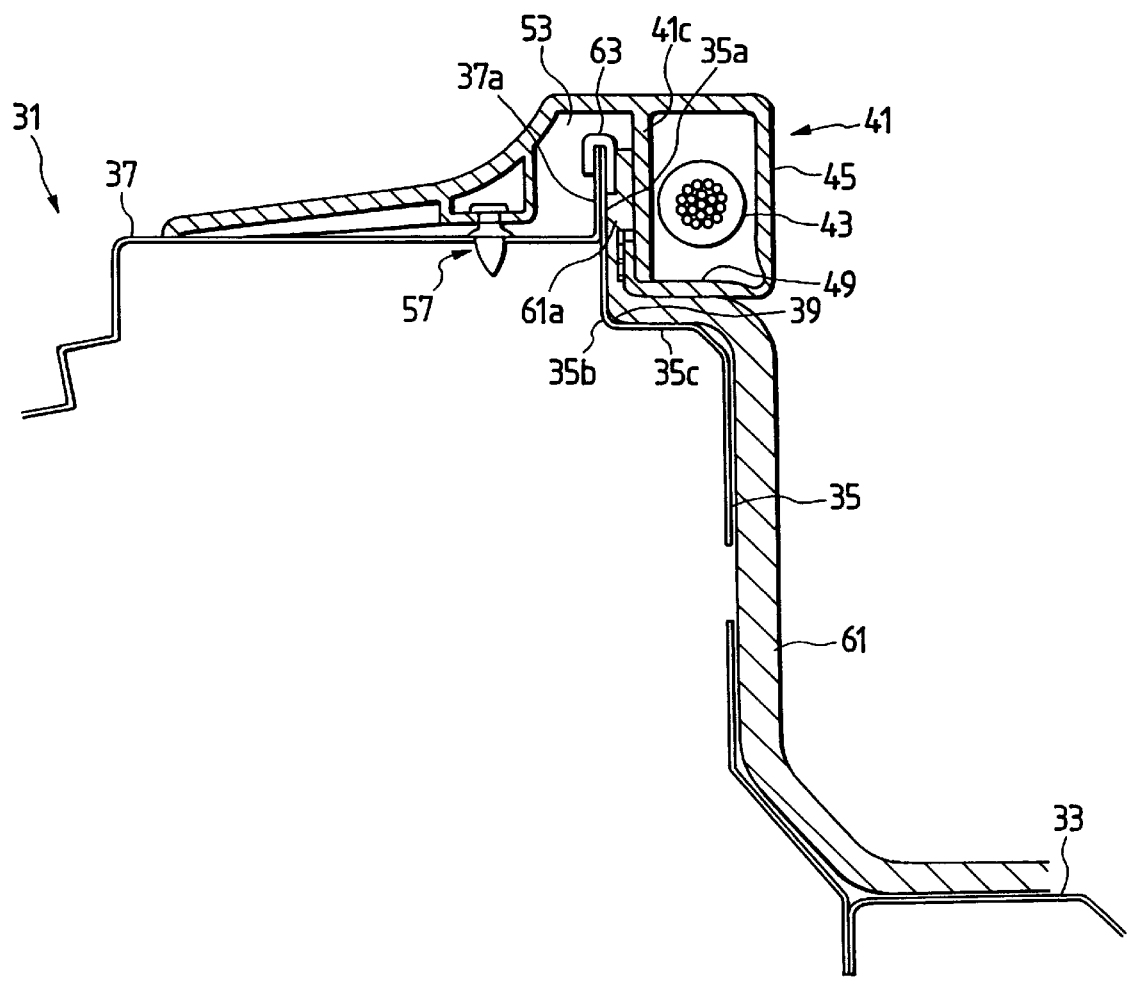
FIG. 1 is a sectional view showing a harness assembling structure on a vehicle floor according to an embodiment of the present invention.
Figure 2:
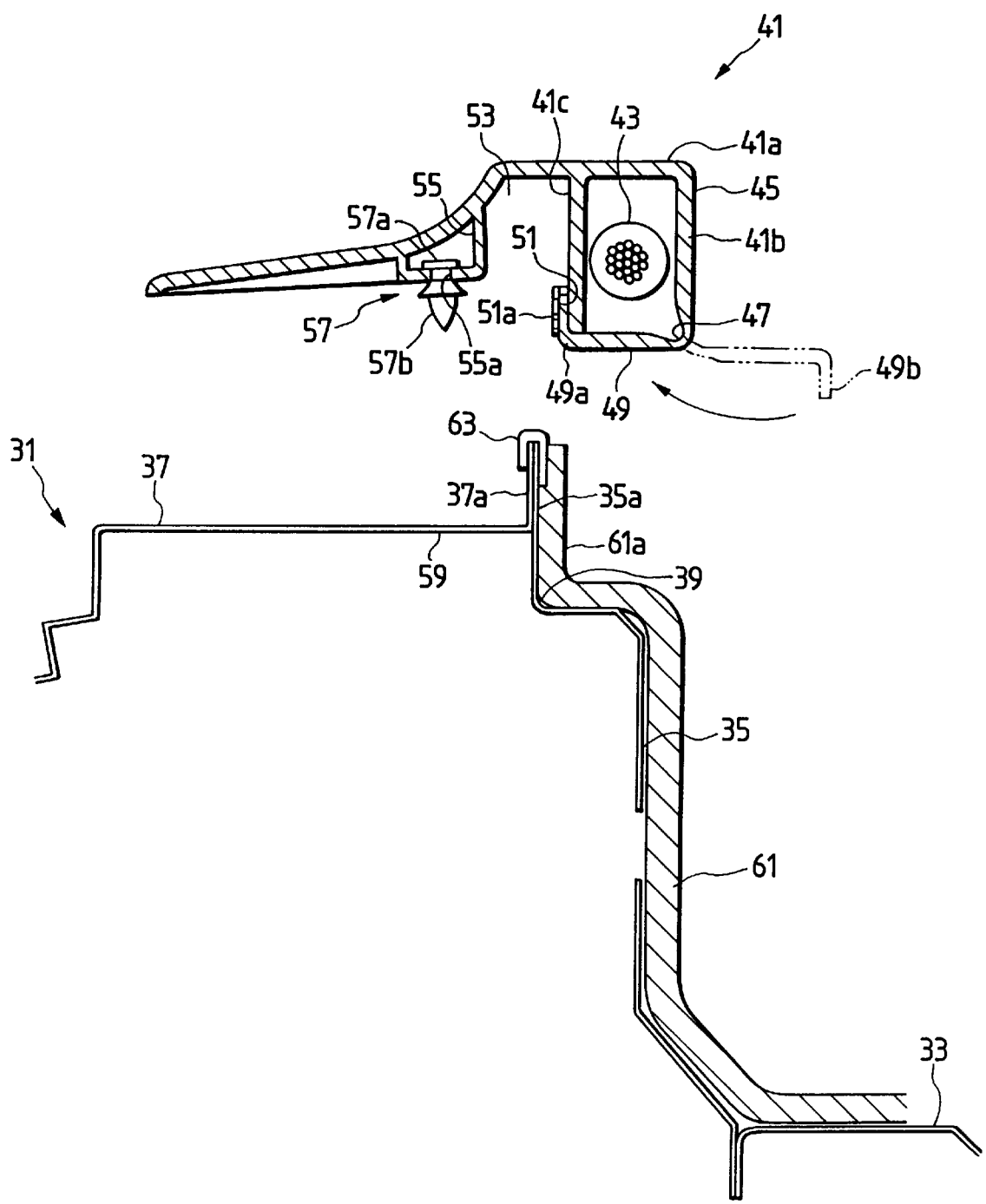
FIG. 2 is exploded sectional view showing the assembling structure shown in FIG. 1.
Figure 3:
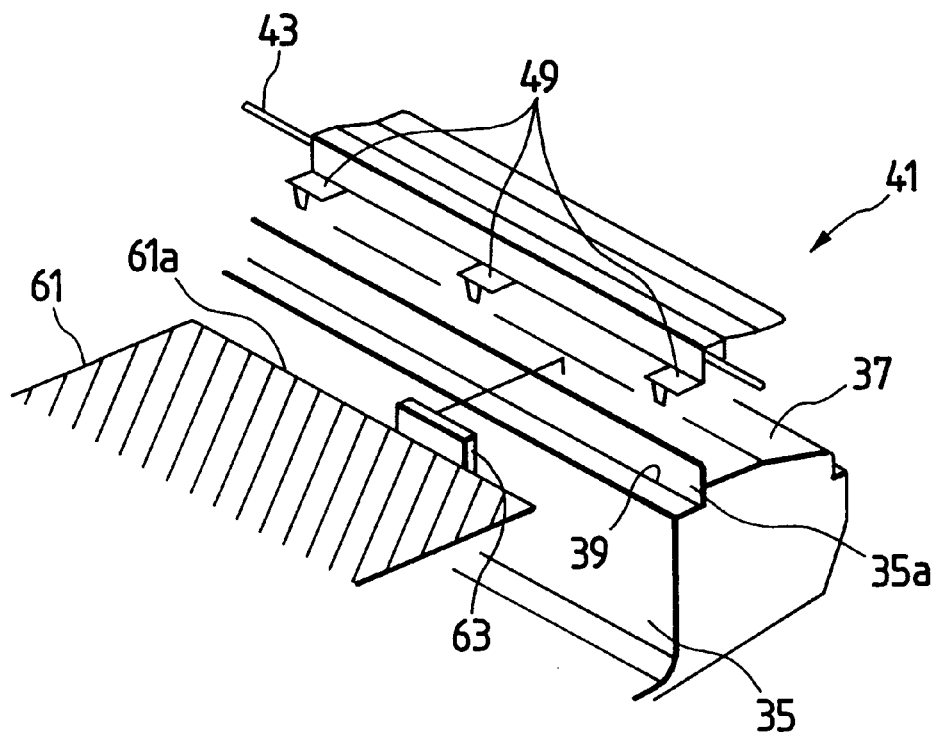
FIG. 3 is an exploded perspective view showing the assembling structure shown in FIG. 1.

FIG. 1 is a sectional view showing the harness assembling structure on a vehicle floor according to the present invention, FIG. 2 is an exploded sectional view showing the assembling structure shown in FIG. 1 and FIG. 3 is an exploded perspective view showing the assembling structure shown in FIG. 1.

A side sill 31 is formed by an inner side sill 35 extending to a floor panel 33 and an outer side sill 37 provided on the out-of-room side. Vertically extending projection pieces (flange portions) 35a, 37a are formed at the end portions of the inner side sill 35 and the outer side sill 37. The inner side sill and the outer side sill of the side sill 31 are combined at the upper walls thereof by welding the flange portions 35a, 37a. The inner side sill 35 is provided with a step portion 39 formed by a vertical wall 35b extending downward along the surface of the flange portion 35a and a horizontal wall 35c perpendicular to the vertical wall 35b.

A scuff plate 41 is formed in a long-plate shape extending to the longitudinal direction of the side sill 31 and having a substantially same width as that of the upper wall of the side sill 31. A U-shaped housing portion 45 opened downward for housing a harness 43 is formed at the inner sill 35 side edge portion of the scuff plate 41. As shown in FIG. 2, the housing portion 45 is formed by an upper wall plate 41a of the scuff plate 41, a side wall plate 41b thereof, and a hung-down plate 41c thereof extending downward from the lower wall plate 41a so as to be in parallel to the side wall plate 41b, thereby forming an enclosure surrounded by these plates.

Covering pieces 49 are provided continuously at the lower end of the side wall plate 41b through thin hinges 47 so as to be rotatable around the hinges, respectively. The tip portion of the covering piece 49 is bent in an L-shape to form a bent portion 49a. An engagement projection 49b is provided at the outer wall of the bent portion so as to protrude therefrom. The hung-down plate 41c is provided at the outer wall thereof with a fitting portion 51 into which the bent portion 49a of the covering piece 49 is fitted. The fitting portion 51 is provided with an engagement hole 51a which engages with the engagement projection 49b of the bent portion 49a. The covering pieces 49 may be provided along the longitudinal direction of the scuff plate 41 with a predetermined interval thereamong.

A clamp supporting base 55 is provided at the lower surface of the upper wall plate 41a so as to be spaced from the hung-down plate 41c with a space 53. The clamp supporting member 55 is provided with a supporting hole 55a for fitting the base portion 57a of a clamp 57 therein. The clamp 57 is provided at the tip portion thereof with an engagement leg portion 57b which engages with the engagement hole 59 formed at the outer side sill 37.

The scuff plate 41 is arranged in a manner that, when the clamp 57 engages with the engagement hole 59, the flange portions 35a, 37a fit into the space 53 and also the hung-down plate 41c of the housing portion 45 is disposed close to and in parallel to the flange portion 35a of the inner side sill 35.

The harness 43 and a carpet 61 are mounted to the side sill 31 by using the scuff plate 41 in the following manner. That is, at first, carpet fixing hooks 63 are fixed to the end portion 61a of the carpet 61. The hooks 63 may be provided at the end portion of the carpet with a predetermined interval thereamong.

In this case, the carpet 61 is sequentially laid from the floor panel 33 side, then laid along the shape of the step portion 39, then raised along the flange portion 35a and put together with the upper end of the flange portion 35a. In this state, the end portion 61a is cut so that an excessive length thereof is removed. The hooks 63 are fixed to the terminal end 61a in such a state, whereby the end portion 61a can be surely aligned with the end portions of the flange portions 35a, 37a and fixed thereto without causing the shortage or excess in the length of the terminal end of the carpet.

Then, the harness 43 is inserted into the housing portion 45 of the scuff plate 41, then the bent portion 49a is fixed in the fitting portion 51, so that the harness 43 is held within the housing portion 45 by the covering pieces 49.

Then, the housing portion 45 is aligned with the step portion 39 and the clamp 57 is engaged with the engagement hole 59 of the outer side sill 37, so that the scuff plate 41 is fixed to the upper wall of the outer side sill 31 as shown by the state of FIG. 1. In this case, the flange portions 35a, 37a are housed within the space 53 of the scuff plate 41. Further, the covering pieces 49 abut at their lower walls against the upper wall of the carpet 61. Furthermore, the scuff plate 41 fastens the end portion 61a of the carpet 61 in a manner that the outer wall of the housing portion 45, that is, the hung-down plate 41c fastens the end portion together with the flange portions 35a, 37a.

In this manner, according to the aforesaid harness assembling on a vehicle floor, the end portion 61a of the carpet 61 is fixed to the flange portions 35a, 37a through the hooks 63 and the scuff plate 41 is fixed to the outer side sill 37. Then, the housing portion 45 is disposed on the step portion 39, the lower walls of the covering pieces 49 abut against the carpet 61, and the hung-down plate 41c fastens the end portion 61a of the carpet 61 together with the flange portions 35a, 37a. As a consequence, the harness 43 can be concealed like the conventional one, and the scuff plate 41 can be fixed without being influenced by the carpet laying procedure. Further, the carpet 61 can be fixed with a high strength due to the fixing structure using the hooks 63 and the fastening structure. Thus, according to the present embodiment, the hook 63 engages with the flange portions (projection pieces) 35a, 37a so as to fix the end portion 61a of the carpet 61. Since the clamp 57 engages with the outer side sill 37, the scuff plate 41 is fixed to the side sill 31, while one of the covering pieces (i.e., the hung-down plate 41c) is caused to abut the end portion 61a of the carpet 61 to thereby fasten the end portion 61a to the flange portions 35a, 37a.

The harness assembling structure on a vehicle floor according to the present invention can be applied not only to the case of performing the assembling at the side sill portion 31 corresponding to one door opening but also to the case of performing the assembling at the two side sill portions 31 corresponding to the front and rear door openings.

Figure 4:
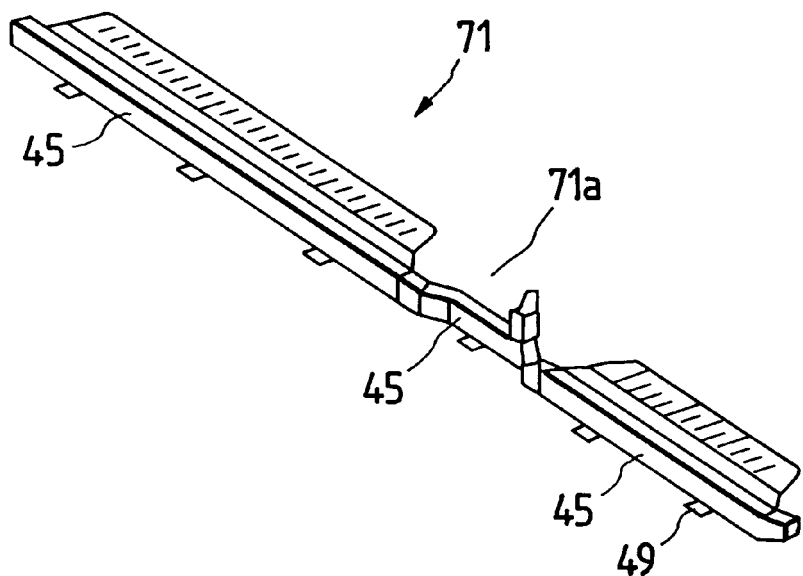
FIG. 4 is a perspective view showing the assembling structure shown in FIG. 1.
Figure 5:
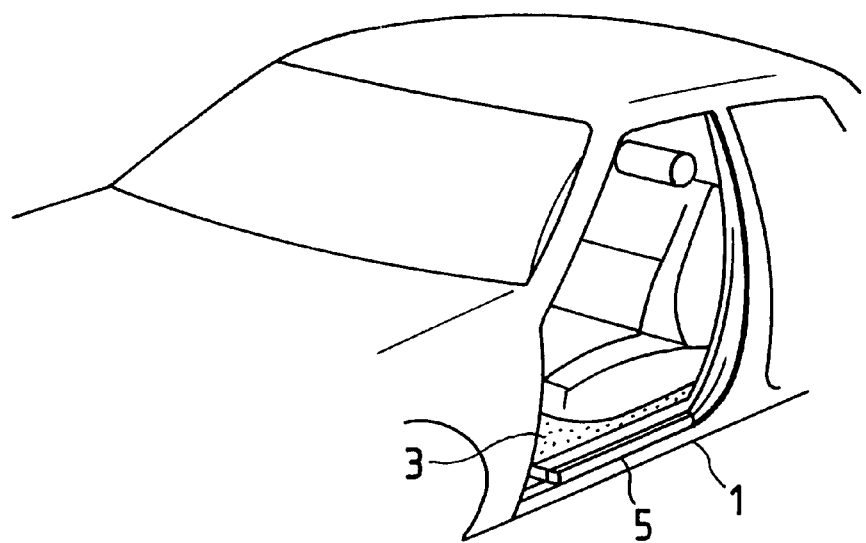
FIG. 5 is a fragmentary perspective view of a vehicle showing an example of a conventional scuff plate mounted on a side sill at the side portion of a floor panel.
Figure 6:
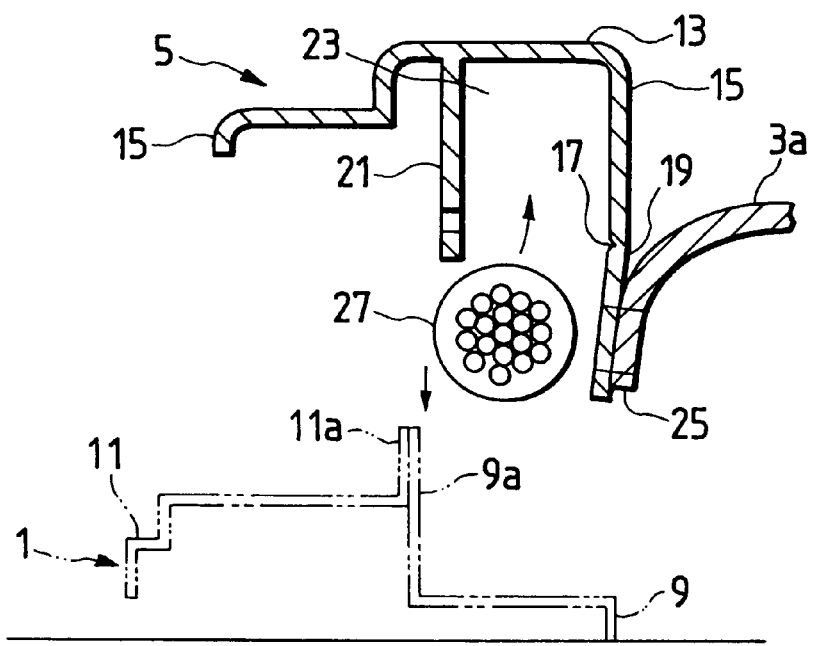
FIG. 6 is an exploded sectional view showing the conventional harness assembling structure on a vehicle floor.
Figure 7:
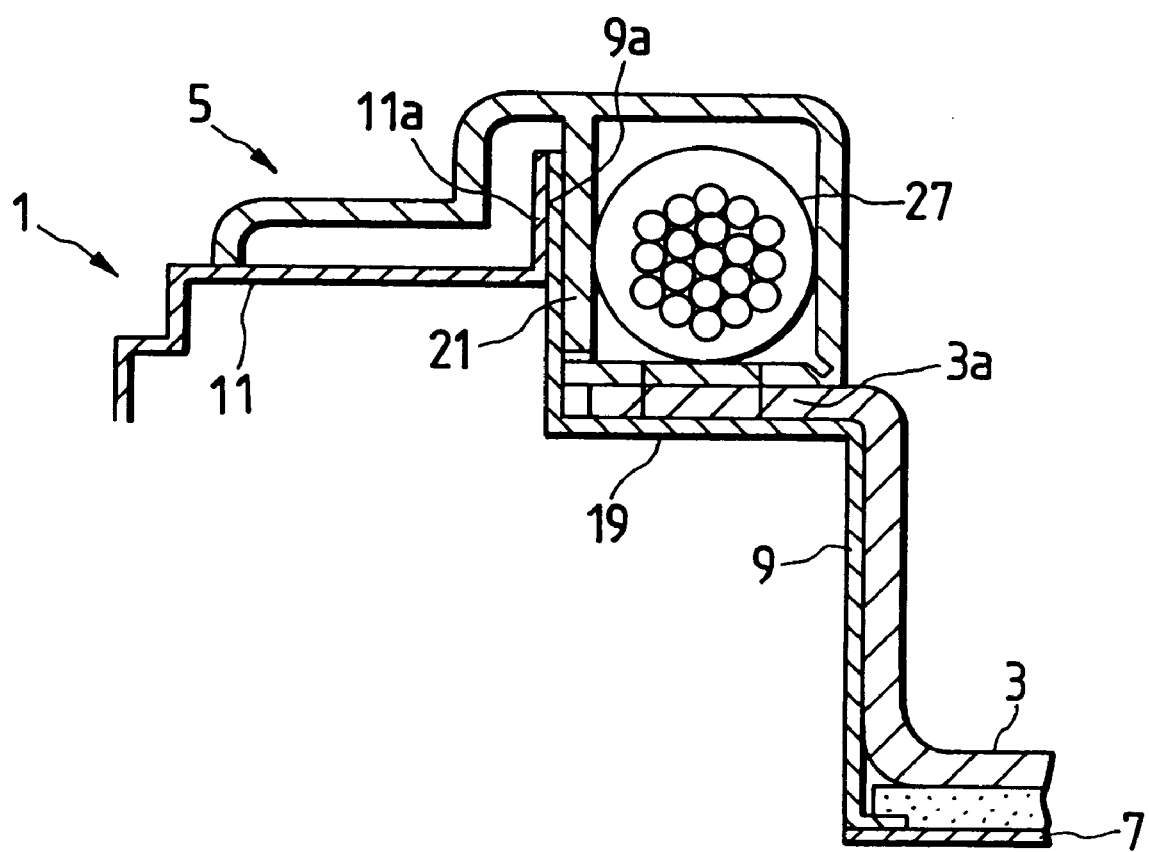
FIG. 7 is a sectional view showing the assembling state of the structure of FIG. 6.

In the latter case, as shown in FIG. 4, a scuff plate 71 is formed by a front and rear integration type scuff plate extending from the not-shown front-door side side sill to the not-shown rear-door side side sill, and a notch portion 71a fitting with a center pillar is formed at the substantially center portion of the scuff plate corresponding to the center pillar.

When the assembling procedure is performed simultaneously at the front-door side side sill and the rear-door side side sill by using such a front and rear integration type scuff plate 71, the number of parts of the scuff plate can be reduced. Further, since the housing portions 45 of the front-door side and rear-door side scuff plates are combined at the center pillar portion, the assembled structure looks better and the protection performance of the harness can be improved.

As described above, according to the harness assembling structure on a vehicle floor according to the present invention, the end portion of the carpet is fixed to the projection pieces through the hooks and the scuff plate is fixed to the outer side sill. Then, the lower walls of the covering pieces abut against the carpet, and the outer wall of the housing portion fastens the end portion of the carpet together with the projection pieces. Thus, the scuff plate can be fixed with a high strength without being influenced by the carpet laying procedure. As a consequence, the workability of the assembling procedure and the reliability of the carpet fixing function can be improved.

Further, according to the harness assembling structure on a vehicle floor employing the front and rear integration type scuff plate, the number of parts of the scuff plate can be reduced and further the assembled structure looks better and the protection performance of the harness can be improved.

What is claimed is:

1. A harness assembling structure for assembling a harness in combination with a vehicle floor comprising:

a side sill having an inner side sill and an outer side sill;

the inner side sill having a projection piece extending upwardly;

the outer side sill having a projection piece extending along said projection piece of said inner side sill;

a scuff plate housing the harness and covering said inner side sill and said outer side sill, said scuff plate including, a U-shaped housing portion having an opening downward, for housing the harness, covering pieces continuously and pivotably provided at said housing portion and engaged with said opening of said housing portion, and a clamp engaging with said outer side sill so as to clamp said scuff plate to said outer side sill; and a hook provided at an end portion of a carpet laid on the vehicle floor, wherein said hook is engaged with said projection pieces so as to fix said end portion of the carpet to said projection pieces, wherein said clamp is engaged with said outer side sill so as to fix said scuff plate to said side sill and so that lower walls of said covering pieces abut against an upper wall of said carpet, and a hung-down wall of said housing portion fastens said end portion of said carpet together with said projection pieces.

2. The harness assembling structure according to claim 1, wherein said scuff plate is formed in a front and rear integration type extending from a front-door side side sill to a rear-door side side sill, a notch portion fitting with a center pillar is formed at a substantially center portion of said front and rear integration type scuff plate in a longitudinal direction thereof, and said end portion of said carpet and said harness laid along said front-door side side sill and said rear-door side side sill are assembled by said single front and rear integration type scuff plate.

3. The harness assembling structure according to claim 1, wherein each of said covering pieces has a bent portion which is bent at a leading end.

4. The harness assembling structure according to claim 3, wherein said bent portions are overlapped on said U-shaped housing in part.

5. The harness assembling structure according to claim 1, wherein the carpet extends to said projection pieces of said inner side sill.

6. The harness assembling structure according to claim 1, wherein said hook fastens the end portion of the carpet to said projection pieces independently of the housing portion.

* * * * *